United States Patent [19]
Lemelson

[11] 3,774,890
[45] Nov. 27, 1973

[54] APPARATUS FOR WORKING MOLDABLE MATERIAL

[76] Inventor: Jerome H. Lemelson, 85 Rector St., Metuchen, N.J. 08840

[22] Filed: Apr. 9, 1971

[21] Appl. No.: 132,670

Related U.S. Application Data

[63] Continuation-in-part of Ser. No. 623,167, Feb. 11, 1967, Pat. No. 3,491,415, which is a continuation-in-part of Ser. No. 142,405, Oct. 2, 1961, Pat. No. 3,422,648, Continuation-in-part of Ser. No. 93,779, Nov. 30, 1970, and a continuation-in-part of Ser. No. 668,561, June 27, 1957, abandoned.

[52] U.S. Cl. .................. 259/185, 259/191, 425/202
[51] Int. Cl. ............................................. B29b 1/10
[58] Field of Search .................... 259/185, 191, 192, 259/193, 9, 10, 4, 27, 47, 37, 19; 264/23, 71, 264/142; 425/200, 202, 376

[56] References Cited
UNITED STATES PATENTS
2,815,535   12/1957   Bodine ...................... 259/DIG. 44
3,045,283   7/1962   Keiser ............................... 259/191
3,151,958   10/1964   Bodine ...................... 259/DIG. 44

*Primary Examiner*—Robert W. Jenkins

[57] ABSTRACT

An apparatus and method for processing and forming material to shape by molding. The material is rendered molten in a chamber and, while disposed therein, forces are applied to the material to densify, degasify and improve its internal structural characteristics by predetermining the shape of the crystalline or spherulite micro-structure. In one form, shock waves of predetermined frequency and intensity are applied to the molten material prior to and during its solidification in a die or mold. In another form, the material is intermittently advanced by a series of compressions applied in such a manner as to densify and predetermine the characteristics thereof when molded to shape.

13 Claims, 6 Drawing Figures

PATENTED NOV 27 1973        3,774,890
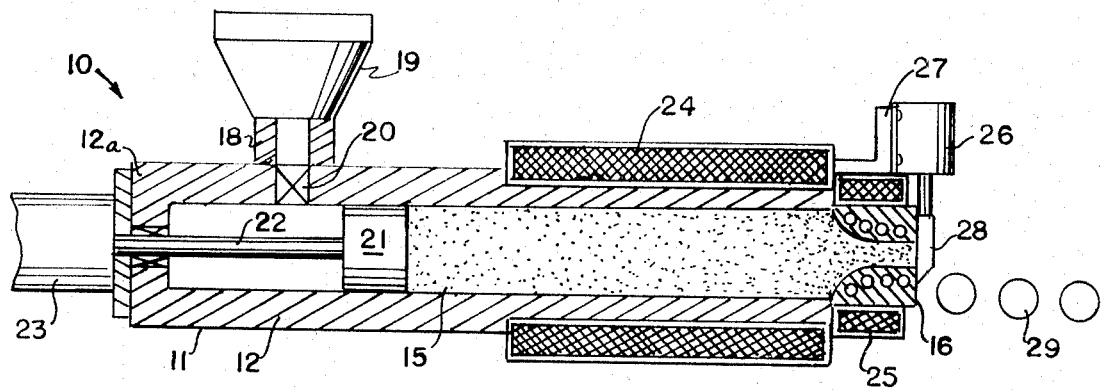
FIG.1
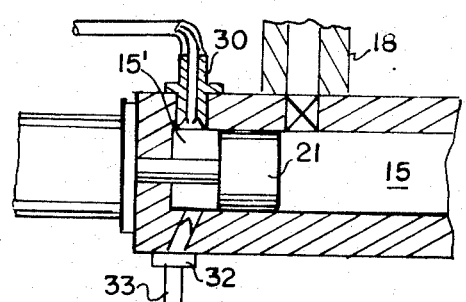
FIG.2
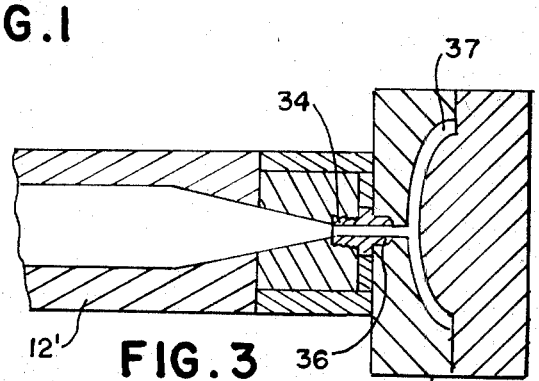
FIG.3
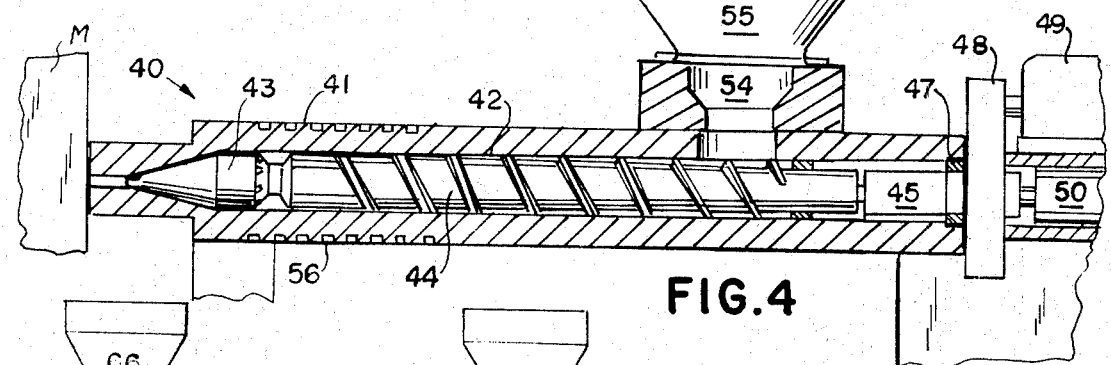
FIG.4
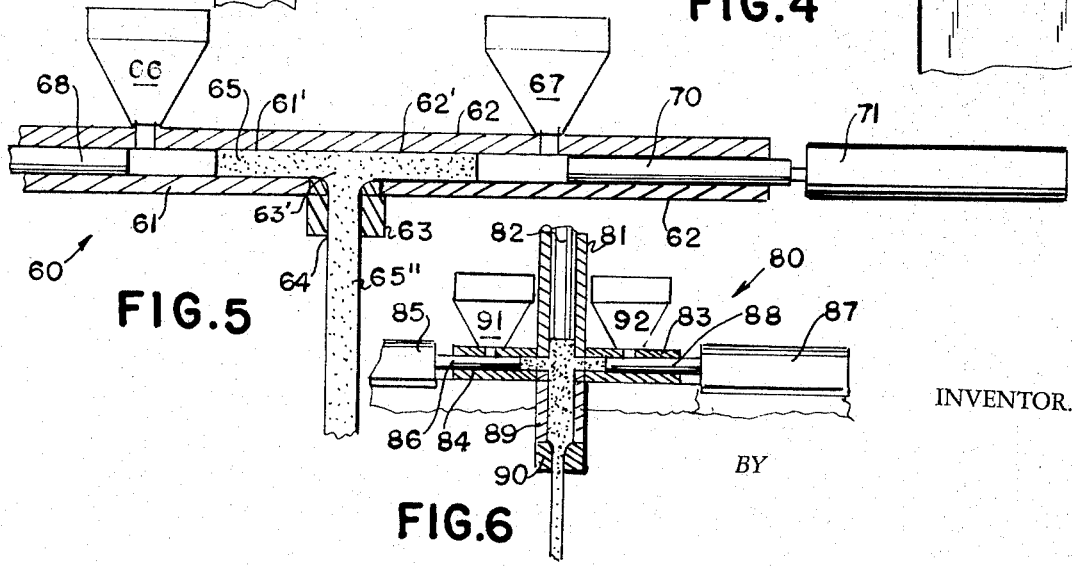
FIG.5
FIG.6
INVENTOR.
BY

APPARATUS FOR WORKING MOLDABLE MATERIAL

RELATED APPLICATIONS

This is a continuation-in-part of application Ser. No. 623,167 filed Feb. 1, 1967, now U.S. Pat. No. 3,491,415 for Extrusion Apparatus and Method which was a continuation-in-part of U.S. parent application Ser. No. 142,405 filed Oct. 2, 1961, now U.S. Pat. No. 3,422,648.

This is also a continuation-in-part of application Ser. No. 93,779 filed Nov. 30, 1970, and a continuation-in-part of Ser. No. 668,561 filed June 27, 1957 entitled Wave Generating Apparatus, now abandoned.

SUMMARY OF THE INVENTION

This invention relates to an apparatus for working a moldable material such as a metal, synthetic polymer or other suitable material preferably during and after a phase in which the material is forced through a mold or die in a molten condition and is solidified therein. By applying intermittent forces such as shock waves to the material during its flow and solidification, both the macro-structure and the micro-structure of the material may be predetermined in characteristic and improved over material subjected to conventional extrusion and injection molding techniques. For example, the crystalline structure of metal and polymers may be substantially improved by applying high-intensity shock waves thereto while it is in a molten and solidifying condition and, in certain instances, after it has solidified to shape. The intensity, duration and frequency of the shock waves applied to the material will be a function of the characteristics of the material itself, the shape of the die or mold through which it is forced, the amount of material employed and the parameters of the extrusion or injection molding apparatus. In certain instances, the shape and direction of the crystallites formed within a solidified molding or extrusion material may be predetermined and substantially improved by the proper application of intense pressure pulses or shock waves to the material during the solidifying phase. The material may be degasified, its grain boundaries uniformly distributed and directed, crystalline structure made uniform and predetermined by means of applying suitable forces to the material during the solidification thereof. When materials are utilized such as polymers and copolymers of various resins such as polyethylene, acrylinatrile butydeine styrene, acetyl resins, polyamides and polyimide resins and the like, higher density forms of these resins may be formed by predeterminately operating the apparatus defined herein.

Accordingly, it is a primary object of this invention to provide a new and improved apparatus for forming the various materials to shape and, during the forming operation, improving their physical and chemical characteristics by operating on same.

Another object is to provide a new and improved apparatus for consolidating particulate material into a solid mass and predeterminately shaping same.

Another object is to provide an apparatus for simultaneously molding and improving the physical characteristics of a variety of molding materials.

Another object is to provide an apparatus for compacting and densifying various materials prior to extruding or molding same to shape. Another object is to provide an extruding or molding apparatus having need for retaining the extrudate within the extrusion chamber while operating thereon to perform one or more of the functions of rendering the material molten, degasifying, densifying and compacting same to improve its physical characteristics.

Another object is to provide extrusion and molding apparatus including means for generating and applying shock waves to the material being extruded or molded.

Another object is to provide an extrusion apparatus wherein shock waves and explosions are generated to both move material and improve its physical characteristics.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view with parts sectioned for clarity of a piston operated extrusion apparatus;

FIG. 2 is a side view with parts sectioned for clarity of a modified form of the apparatus of FIG. 1;

FIG. 3 is a sectioned side view of a portion of a modified form of the apparatus of FIG. 1; and FIG. 4 is a side view with parts sectioned for clarity of a screw operated molding machine containing features of the instant invention.

FIG. 5 is a side view with parts sectioned for clarity of a multiple chamber extrusion apparatus for feeding the same or different materials to a die or mold and FIG. 6 is a side view with parts section of a modified form of the apparatus of FIG. 5.

There is shown in FIG. 1 an apparatus 10 including an extruder 11 for processing an extrudate such as a thermoplastic polymer or a metal which is fed to the bore 15 of the extruder in a fluent condition such as a particulate solid material fed from a hopper 19 through a valve 20 located in a chamber 18 which is lateral to the main chamber 12 of the extruder. The extrudate is forced through the extrusion chamber volume 15 to a constricted or reduced diameter opening 17 in a die 16 located at the end of chamber 12. A piston 21 is shown slidably movable within the bore of the extruder or volume 15 and is connected to a shaft 22 extending from a lineal actuator 23 such as a hydraulic ram, lineal gear motor or other suitable prime mover capable of moving the piston longitudinally within the volume 15 to force extrusion material disposed therein through the die 16.

The lineal actuator 23 which is illustrated as supported by the rear wall 12a of the extrusion chamber may be operated in a plurality of modes including one in which a constant force of sufficient magnitude is applied to the piston 21 to force material through die 16. Simultaneously or sequentially with respect to the steady force applied to piston 21 to compress and force extrusion material through the chamber bore 15, actuator 23 may be pulsed in its operation by either intermittently applying pulse inputs of fluid or electrical energy thereto with or without the application of a steady input of energy or by activating an oscillating transducer coupled to shaft 22 within the housing of the actuator 23 so as to impart intermittent forces to the piston 21 for intermittently applying said forces to the material within the volume 15. The intermittent forces so applied may be operable to perform a plurality of functions including facilitating the movement of extrusion material through the extrusion chamber and die opening, densifying the extrudate and improving its internal structural characteristics such as its crystalline structure.

Extrusion material in the form of a powder, pellets, filaments or molten material is fed from a supply or hopper 19, the end of which is coupled to a branch chamber 18 connected to the interior volume 15 of the extrusion chamber 12 through valve 20 which is predeterminately controlled to regulate the flow of material from supply means 19 to the extrusion chamber volume 15.

In a typical operational cycle which may be controled by a program controller such as a multi-circuit timer of conventional design or a computer generating signals for controlling the operation of various servo motors and actuators associated with the extrusion apparatus 10, the lineal actuator 23 is controlled to retract shaft 22 drawing piston 21 towards the actuator to clear the valve 20. Thereafter, valve 20 is opened for a time interval to permit a predetermined quantity of material to be fed therethrough from supply chamber 19 into the volume 15 ahead of the piston 21. The material delivered to volume 15 may partially or completely fill same after which the valve 20 closes and piston 21 is advanced by the controlled operation of actuator 23. The piston 21 then operates to force extrusion material through the chamber and die 16 to form an extrusion of predetermined shape thereof. The piston 21 may be operated to apply a constant force to the extrusion material and chamber 15 as intermittent blows or shock waves are applied to said material through the piston. The piston may also be operated in a series of steps in which it is first advanced to first compress the extrusion material, after which it is oscillated a predetermined number of times or at a predetermined frequency as it advances against the extrusion material to compact and degasify, densify and change the internal structure thereof either within the chamber volume 15 and/or the passageway 17 through the die 16.

If the extrusion material is provided in pellet or particle form such as powdered metal or powdered polymer, the operation of piston 21 as described may serve to compact and consolidate the particles into a solid mass by the force and shocks applied by the piston to the particles. If the material introduced through valve 20 is in a molten condition, the forces applied to the piston 21 to the molten material in the extrusion chamber as it solidifies at or immediately in advance of die 16, may be operable affect and predetermine the grain or crystalline structure of the extruded material such as to substantially predeterminately shape and align the crystals, crystallites or spherulites or other formations comprising the macro structure and the micro structure of the material so processed.

The apparatus 10 is also provided with an electrical induction coil 24 surrounding chamber 12 and controllably operable to predeterminately heat the chamber wall and/or the extrusion material, if metal, disposed therein for rendering same in a molten condition so that it may be processed as described and forced to shape through the die opening 17. Also shown disposed about the die 16 is a second coil or ray of coils 25 defining an electro-magnetic or magnetics which may be predeterminately energized either during the entire extrusion operation or in an intermittent manner to serve a plurality of functions including forcing the extrusion material, if suitable metal, through the die. The electro-magnet 25 which may be made of superconducting wire, may also be operable to predetermine the shape and direction of the crystals forming the internal structure of the extrudate as it passes through the die. In other words, the magnetic fields generated by coil 25 may be applied per se or as an auxiliary means together with the energy imparted through piston 21 to align or otherwise predetermine the shape and direction of the crystals or crystallites forming the internal structure of the extrusion.

Also illustrated in FIG. 1 is a device including a blade-like gate 28 which is movable across the opening in die 16 so as to prevent the flow of extrudate therefrom during that portion of the cycle in which material is charged into the extrusion chamber and/or during one or more stages of the extrusion cycle wherein extrusion material is compacted by the steady or oscillatory movement of piston 21 and/or the operation of electro-magnet 25. Gate or blade 28 is advanced across the opening in die 16 to seal same and retract it therefrom by means of a lineal actuator 26, the shaft of which is connected to blade 28. Actuator 26 is supported on a bracket 27 secured to the upper wall of the chamber 12 and die and is predeterminately controlled in its operation by the described master controller which controls the operation of actuator 23, valve 20, induction coil 24, electro-magnetic 25 and certain other auxiliary apparatus to be described.

Actuator 26 may be operated to move gate 28 across the opening in die 16 during the initial operation of the piston 21 advancing against material disposed within chamber volume 15 and may be retracted until piston 21 is withdrawn to permit a new charge to be disposed in chamber volume 15. Accordingly, piston 21 does not completely extrude all of the material in volume 15 but a predetermined quantity of said material remains therein and is extruded after the new charge is inserted into the extrusion chamber and compressed by the piston. Such remaining quantity of extrusion material is preferably in a semi-molten condition whereby it will not flow back as the piston is withdrawn, yet is provided and retained at sufficient temperature to consolidate with the new charge of extrusion material and the extruder therewith without forming a noticeable interface.

In FIG. 1, notation 16c refers to passageways extending through die 16 through which a coolant may be controllably flowed to receive and transfer heat from material entering the die to rapidly solidify said material so that it may be formed to shape in the die and retain its shape when it exits therefrom. Notation 29 refers to a take-off conveyor disposed to receive material from the die which may comprise a powered belt or flight conveyor or a plurality of motor-driven rollers. Both the motor driving the take-off conveyor and the motor driving the pump for pumping coolant liquid through the die passageway 16c may be automtically controlled by the same automatic controller controlling the operation of the extrusion prime mover and the energization of the magnetic coil, the means for generating shock waves in the extrudate and the servo for advancing the blade 28 across the face of the extrusion die.

The coil 24, in addition to being used as an induction coil, may also comprise a magnetic coil operative to generate, when pulsed by suitable electrical energy, a magnetic field of sufficient intensity to generate a shock wave in the extrudate which may be utilized per se or in coaction with the shockwaves generated by the piston to densify and affect the extrusion material as descibed. The shock waves may be generated in the wall of the extrusion chamber and directed radially and/or oblique to the longitudinal axis thereof by pulsing the coil 24 and a predetermined frequency per se or in synchronization with the generation of the shockwaves by the piston means described.

Whereas in FIG. 1, intermittent operation of the actuator 23 by pulsing input energy thereto is operative to apply blows or shocks through piston 21 to the extrusion material, in FIG. 2, an auxiliary means is provided for applying shock-waves through the piston to the extrusion material. Disposed between the piston 21 and the end wall 13 of extrusion chamber 12 is a volume 15 containing a gas in which volume shock waves are generated and applied to the rear face of piston 21. The shock waves are pressure pulses applied to the piston and transmitted therethrough to the extrusion material disposed against the front face of the piston for the purposes described.

A number of means may be applied for generating shock waves in volume 15'. In one, intense electrical discharges are intermittently generated across electrodes forming part of an electrode assembly 30 which electrodes are coupled to the chamber volume 15'. The sparks generate shock waves in the gas within the volume 15' and such shock waves are transmitted directly to the rear face of the piston through which they are transmitted to the extrusion material against the front face of the piston. In another technique of generating shock waves, a gaseous or vaporous fuel is intermittently injected through a nozzle 32 extending through an opening in the wall 12 as received through a conduit 33 from a supply of said fuel. The fuel is intermittently ignited by the sparks generated across the electrodes of device 30 which may comprise a spark plug and each explosion imparts a blow to the rear face of the piston which may serve two purposes. The resultant force may be applied to move the piston and force extrusion material through the extrusion chamber. It may also be operable to apply a blow or blows to the extrusion material in the form of a shock wave which travels therealong to the material being consolidated and solidified at or in advance of the die 16 for predeterminately affecting the internal structure thereof as described. Operation of the fuel injection means, the exhaust valve 34 and the electrical discharge means connected to the electrode device 30 through wires 31 are preferably controlled by the described master controller or computer controlling the other devices of the apparatus in a predetermined extrusion cycle.

It is noted that the apparatus shown in FIGS. 1 and 2 may also be utilized, by modifying or changing the extrusion die to form individual articles of material processed and passed through the chamber 12 as described. For example, an injection nozzle coupled to or replacing die 16 may be secured or coupled to a mold whereby a predetermined quantity of material forced through volume 15 may be injected or extruded into the mold and processed as described prior to and while disposed in the mold in coupling relationship with the material in volume 15. In other words, a modified form of the apparatus of FIGS. 1 and 2 may be utilized to injection mold material to shape which material has been densified, degasified and structurally improved by the imparting of shocks or shock waves to the material prior to, during and after its injection into the mold.

FIG. 3 illustrates a nozzle disposed at the end of the extrusion chamber 12' and replacing the die of FIG. 1. The nozzle 34 is shown coupled to an inlet opening 36 in a two-part mold 35 having a molding cavity 37 into which molding material is injected and is processed, as described, by shock waves imparted thereto during its movement through the nozzle and, in certain cases, after it has flowed into the mold cavity. The amount of material introduced into the chamber volume 15 between the piston 21 and nozzle 34 may be just that amount required to fill the cavity of the mold or a multiple of the amount required to fill the mold cavity.

In a particular mode of operation of the apparatus of FIG. 3, the new charge of material disposed within volume 15 or the remaining amount of material in said volume after a quantity thereof has been injected into the mold cavity may be worked as described by imparting intermittent blow or shock waves thereto while the nozzle and material therein is in coupling relationship with the material in the mold cavity prior to opening the mold and removing the molded article therefrom. In other words, by working the molding material between the piston 21 and the nozzle 34 while there is material in the nozzle and material extending therefrom into the mold cavity, it may be compacted, densified, degassed and structurally improved as described without the need to provide a gate such as the blade gate 28 of FIG. 1 so that after the molding is removed from the mold, the next charge admitted to the mold will have been at least partially if not completely worked and improved in its structure from the operations performed thereon during the previous molding cycle.

It is noted that if the material admitted to the extrusion chamber volume 15 is a polymer such as polyethylene, the shock waves imparted thereto through the piston may be employed to increase the molecular weight of the polymer and form a high-density material thereof as the result of the heat, pressure and shock wave forces applied thereto.

The extrudate may also comprise other materials such as powdered metal which may be worked with shock waves as described or a slug of metal which may be inductively heated and worked with shock waves pass therethrough as described. Powdered aluminum, or other metals may also be fed to the chamber with reinforcing filaments of materials such as boron nitride, tungsten carbide, or carbides, nitrides or oxides of various metals added thereto.

FIG. 3 illustrates another form of the invention wherein the described piston is replaced by a screw such as utilized in a conventional screw fed injection molding machine. The apparatus 40 includes a chamber 41 containing a passageway 32 extending longitudinally therethrough, in which passageway an injection screw 44 is disposed and is operable to rotate therein for advancing molding material to an injection nozzle 46 located at the end of passageway 42. The screw 44 is supported on a shaft 45 which extends through a rotary seal 47 provided in the end wall of chamber 41. The shaft 45 is rotated by a gear train 48 which is connected to be driven by a controlled motor 49 located offset from the shaft. A lineal actuator 50 is located in direct alignment with shaft 45 and secured to the rear wall of chamber 41 and is operative to oscillate screw 44 in a longitudinal direction within the chamber 32. The actuator 50 may impart blows or shock waves to the screw through shaft 45 for imparting forces including shock waves to the material disposed within the confines of the screw and in advance thereof between the end of chamber 42 and nozzle 46. The nozzle 46 is shown coupled to the inlet 53 of a multiple-part mold 51 to permit material to be flowed therefrom as the screw 44 rotates to be injected into the mold cavity 52.

Particulate or molten molding material is admitted through a branch passageway 54 from a hopper or accumulator 55 located above the chamber 41 and motor 49 is operated in such a manner as to inject a predetermined quantity of molding material into the mold cavity during and after which the actuator for oscillator operates to impart compression forces and shock waves to the material coupled thereto, e.g., the material in advance of, and within, nozzle 46 and that also disposed in a mold cavity.

Notation 56 refers to heating coils disposed in the wall of the chamber 31 for rendering the molding material molten.

In operation of the apparatus of FIG. 4, a master controller or a computer may be utilized to control the operation of the various described devices including screw drive motor 49, oscillator 50 and other auxiliary variable input means including energization of the heating coils 56. If material is forced into passageway 32 by means of an accululator or motor-driven screw located within the reservoir or hopper 55, it too may be controlled by the described master controller or computer. Such master controller may comprise a so-called multi-circuit timer such as a constant speed motor driven shaft containing cams at different locations thereon which are operative to close and open electrical switches for providing electrical energy to energize the various electrically operated or controlled devices described during predetermined times in an extrusion or molding cycle. Various forms of multi-circuit timers or controllers are known in the art which may be utilized in the described apparatus.

It is also noted that the device 50 for oscillating or imparting shock waves to the screw 44, may comprise an electro-mechanical device such as a solenoid operated hammer, a magnetostrictive transducer or other suitable means or imparting oscillatory movements and/or shock waves to the shaft of the screw. The device 50 may also comprise means for generating an intense radiation beam and directing same against a plate or piston coupled to the screw shaft to generate shock waves therein which are imparted to the shaft, the screw and the material in advance of the screw to effect the described densifying and structural improvement functions.

The apparatus of FIG. 1-4 may also be operated in another mode wherein the described piston is intermittently forced against the material in the chamber to intermittently compact and advance said material through the die or injection nozzle a number of times for each cycle, between or during which compactions, shock waves are applied through the piston to the material. Similarly, the screw means of FIG. 4 may be intermittently operated to rotate and/or oscillate in a manner such as to intermittently advance injection material into the mold or through an extrusion die concurrently or between which intermittent operations shock waves are applied to the material. The means driving the screw or piston may be operated in such a manner as to intermittently generate therein shockwaves which are transmitted to the extrudate as it is moved through the chamber for the purposes described. The operation of the means generating the shochwaves may be so controlled that the shock waves propogated along the extrudate may vary in intensity during an extrusion cycle to predeterminately affect the extrudate and the physical condition of the extrusion or molding formed therefrom. For example, as the extrudate is compacted and reduced in volume the frequency of the shock waves my be increased while the intensity either remains constant or decreases.

Ultrasonic energy may also be applied to the extrudate either concurrently with the application of intermittent shock waves or may be applied in between predetermined groups of shock waves. Such ultrasonic energy may be applied by energizing one or more transducers located in the piston, screw or extrusion chamber wall. In a particular mode of operation, the ultrasonic energy may be applied to the extrudate as it passes through the die and after it has been operated on the the shock waves in the extrusion chamber. The screw head 43 of FIG. 4 may also operate to impart shock waves to the extrudate by moving relative to the screw itself.

FIG. 5 shows an apparatus 60 for working and extruding the same or different materials by one or more of the techniques described herein. Opposed extrusion chambers 61 and 62 have respective aligned bores 61' and 62' which communicate with each other at their ends and into which respective charges of extrudate are fed from inlets extending from respective hoppers 66 and 67. Pistons 68 and 70 are driven towards each other in bores 61' and 62' to force respective charges of the extrudate materials inroduced into the bores when the pistons 68 and 70 are retracted beyond the outlets of the hoppers 66 and 67. Thereafter the pistons 68 and 70 are advanced by their respective actuators, towards each other to move the charges together and move the mixture through a die 63, the opening 64 of which communicates with the bores 61' and 62' where they meet. A blade of the type provided in FIG. 1 may be movable by a servo across the opening 64 in die 63 while the pistons 68 and 70 move their respective charges together and compact said charges, as described, with a steady or intermittent forces applied thereto for densifying, degassing, and predetermining the internal structure of the mixture effected in die 63.

Pistons 68 and 70 may be replaced by respective extrusion screws such as the type shown in FIG. 4 wherein each is driven by a respective motor and the two motors are respectively speed controlled in their operation to rotate each screw at the same speed or at different speeds so as to effect the predetermined mixing of the respective charges in the die 63.

In a particular form of the invention shown in FIG. 5 the composition of the composite extrusion 65'' formed in die 63 is predetermined by the automatic controlled movement of the servos moving pistons 68 and 70. By providing a variable program control system of the type defined in SER. NO. 142,405 to control each of the prime movers of the pistons 68 and 70, the rates of flow of the respective materials may be predetermined to provide predetermined quantities of each material in the composite extrusion. If it is desired to vary the composite extrusion composition along its length to impart variable or different characteristics thereto along different longitudinal portions of the extrusion, the rate of travel of the pistons 68 and 70 may be predeterminately varied during an extrusion cycle.

While the passageways 61' and 62' of the apparatus 60 of FIG. 6 are shown in direct alignment with each other, they may also be directed into a mixing zone at an acute angle to each other. The mixing zone where passageways 61' and 62' meet may also be substantially more complex than illustrated and shaped to better promote mixing or to vary the degree of mixing of the two extrudates fed thereto by the respective pistons or screws operating in chambers 61 and 62. For example, a pin, group of pins, mandrel or other shape disposed in the mixing zone 63' may be variably adjusted in position to vary the nature of the mixing of the two materials fed to the mixing zone.

The means provided in FIGS. 1 to 4 may be applied to the apparatus 60 for imparting shock waves, magnetic forces and induction heating to either or both extrudates fed to the mixing zone and the extrusion die 63. Shockwaves may be applied per se to either or both extrudates through the prime moving pistons or by means of magnetic fields generated by one or mor magnetic coils or superconducting magnets disposed in or about the extrusion chambers 61 and 62 and/or the extrusion die 63. Such coils may be employed to impart radially directed shock waves to either or both extrudates during either or both the initiation of the magnetic field and the termination or collapsing thereof. The coils may also be operative to apply shock waves to the mixing or mixed extrudate as it enters and passes through the extrusion die to enhance mixing and consolidation of the extrusion materials and/or effect chemical reactions and bonds between the molecules of the extrusion materials as they enter the mixing zone 63' and die 63.

In FIG. 6, charges of the same or different materials are fed from respective chambers 83 and 84 which extend laterally to a central chamber 81 wherein the charges mix and are fed to a die 90 at an end portion 89 of the central chamber by a piston 82 operating in the central chamber. This movement of the extrudate material or materials is effected by the operation of the pistons 86 and 88 driven by the lineal actuators 85 and 87 in chambers 83 and 84 and by piston 82 operating in chamber 81. The same or different extrudates may be fed to the respective aligned chambers 83 and 84 through valves associated with respective hoppers or powered feed means 92 and 91 while the pistons 86 and 88 are withdrawn from chambers 83 and 84 to clear the hopper inlets. Shock waves may be transmitted, as described, through any or all three of the pistons shown in FIG. 6 to the respective extrudates and the mixture thereof in chamber 89 which extends from the mixing zone to the extrusion die 90. Material may also be admitted to the chamber 81 through another hopper or pump fed valve (not shown) upon proper withdrawal of the piston 82. In a particular embodiment, the piston 82 may be employed to impart shock waves to the extrudate by blows imparted thereto at the mixing zone to improve mixing and the characteristics of the extrudate and to facilitate its movement through chamber 89 and die 90 in the manner described above. Magnetic coil means, as described, may also be disposed about any or all of the chambers 81, 83, 84 or 89 and/or the extrusion die 90 for the purposes described above. Shock waves generated in chambers 83 and 84 may be timed to pass through the respective extrudates and arrive simultaneously at the mixing zone. Shock waves generated by piston 82 may also be timed in its generation to arrive at the mixing zone or junction of all three chambers at the same time the shock waves generated in the chambers 83 and 84 arrive thereat so that all three shock waves cooperate with each other in working the mixing or mixed material.

I claim:

1. An apparatus for working and molding material to shape comprising:
   first means for feeding a moldable material,
   second means for receiving and forming said moldable material to shape, and
   third means predeterminately disposed with respect to said first and second means and operable to impart a plurality of shock waves to said moldable material for working same and improving its characteristics and the characteristics of the molded product formed therefrom.

2. An apparatus in accordance with claim 1 wherein said third means is a piston disposed in direct contact with said moldable material and means for oscillating said piston in such a manner as to impart said shock waves to said moldable material engaging said piston.

3. An apparatus in accordance with claim 1 wherein said third means is a member contacting said moldable material, and means for generating (and directing) shock waves in said member
   and directing said shock waves therethrough to said moldable material.

4. An apparatus in accordance with claim 3 wherein said means for generating shock waves comprises means for generating explosions and directing said explosions against said member.

5. An apparatus in accordance with claim 1 wherein said first means includes an injection screw, means for power rotating said injection screw so as to feed said moldable material, and said second means comprises a mold with a molding cavity and an opening thereto for receiving moldable material fed by said injection screw.

6. An apparatus in accordance with claim 5 wherein said third means is operably coupled to said injection screw to impart shock waves thereto which shock waves are imparted from said screw to the molding material fed thereby to said mold.

7. An apparatus in accordance with claim 1 wherein said first means is an extrusion screw, means for feeding moldable material to said screw, means for power rotating said screw to move material fed thereto; said second means comprises an extrusion die with an opening therethrough for defining the shape of an extrusion and passageway means between said screw and said die for directing the material fed by said screw to said die opening.

8. An apparatus in accordance with claim 7 wherein said third means is coupled to transmit shock waves to said extrusion screw which, in turn, is operable to transmit said shock waves to the molding material in said passageway.

9. An apparatus in accordance with claim 8 including fourth means operable to block and permit the flow of material from said die and means for operating said fourth means in a manner to retain material in the die while said third means operates and imparts shock waves to said material.

10. An apparatus in accordance with claim 1 wherein said third means includes an intense magnetic field generating means and means for energizing said magnetic field generating means in such a manner as to cause it to generate and vary a magnetic field of sufficient intensity to impart shock waves to said moldable material.

11. An apparatus in accordance with claim 10 wherein said intense magnetic field generating means comprises coil means located and operable to impart shock waves to said second means while the molding material is disposed therein.

12. An apparatus in accordance with claim 1 wherein said third means is a rigid member in direct contact with said moldable material and means for moving siad rigid member against said moldable material in such a manner as to cause it to impart shock waves thereto for working said moldable material.

13. An apparatus in accordance with claim 1 wherein said third means is disposed in direct contact with said moldable material for imparting shock waves to said moldable material while said moldable material is disposed within said second means.

* * * * *